(12) United States Patent
Liu et al.

(10) Patent No.: US 10,946,747 B2
(45) Date of Patent: Mar. 16, 2021

(54) VEHICLE

(71) Applicant: HONDA MOTOR CO., LTD., Tokyo (JP)

(72) Inventors: Xiang Liu, Wako (JP); Yoshihiro Sunaga, Wako (JP); Tadaaki Tsuji, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 221 days.

(21) Appl. No.: 16/296,691

(22) Filed: Mar. 8, 2019

(65) Prior Publication Data

US 2019/0283608 A1 Sep. 19, 2019

(30) Foreign Application Priority Data

Mar. 19, 2018 (JP) .............................. JP2018-051212

(51) Int. Cl.
*B60L 3/00* (2019.01)
*B60L 58/13* (2019.01)
(Continued)

(52) U.S. Cl.
CPC .............. *B60L 3/0084* (2013.01); *B60L 3/06* (2013.01); *B60L 58/13* (2019.02); *H02P 23/22* (2016.02); *B60L 2240/12* (2013.01); *B60W 10/26* (2013.01)

(58) Field of Classification Search
CPC .................................................. B60L 3/0084
(Continued)

(56) References Cited

U.S. PATENT DOCUMENTS

2013/0062941 A1 3/2013 Yamamoto et al.
2013/0187449 A1* 7/2013 Mouri ..................... B60L 1/006
307/10.1
(Continued)

FOREIGN PATENT DOCUMENTS

EP 1738947 A2 1/2007
JP 2000-234539 A 8/2000
(Continued)

OTHER PUBLICATIONS

Office Action dated Jan. 24, 2020, issued in counterpart EP Application No. 102019203647.3, with English translation (28 pages).
(Continued)

*Primary Examiner* — Jerry D Robbins
(74) *Attorney, Agent, or Firm* — Westerman, Hattori, Daniels & Adrian, LLP

(57) ABSTRACT

To provide a vehicle in which an increase or fluctuations in engine vibration or noise during external electric power supply can be suppressed. A vehicle includes an electric power generation device, a battery connected to the electric power generation device via a power line, an external electric power supply device that interconnects the power line and external equipment, and an ECU that controls charging and discharging of the electric power generation device and the battery. The ECU starts an engine and supplies electric power generated by a generator to the battery and the external equipment in a case where a SOC is equal to or less than a use lower limit SOC and supplies the external equipment with electric power from the battery in a case where the SOC exceeds a use upper limit SOC. In addition, the ECU executes fixed point control for controlling the engine and the generator.

5 Claims, 11 Drawing Sheets

(51) Int. Cl.
*H02P 23/22* (2016.01)
*B60L 3/06* (2006.01)
*B60W 10/26* (2006.01)

(58) Field of Classification Search
USPC .......................................................... 320/137
See application file for complete search history.

(56) References Cited

U.S. PATENT DOCUMENTS

| 2014/0080024 | A1* | 3/2014 | Igarashi | ............ | H01M 8/04723 |
| | | | | | 429/437 |
| 2016/0114690 | A1* | 4/2016 | Matsubara | .......... | B60L 11/1861 |
| | | | | | 307/10.1 |
| 2016/0137065 | A1* | 5/2016 | Matsubara | .............. | B60L 1/006 |
| | | | | | 307/10.1 |

FOREIGN PATENT DOCUMENTS

| JP | 2008-247252 A | 10/2008 |
| JP | 2011-240863 A | 12/2011 |
| JP | 2013-184642 A | 9/2013 |

OTHER PUBLICATIONS

Notification of Reasons for Refusal dated Oct. 8, 2019, issued in counterpart JP Application No. 2018-051212 (2 pages).

* cited by examiner

VEHICLE

This application is based on and claims the benefit of priority from Japanese Patent Application No. 2018-051212, filed on 19 Mar. 2018, the content of which is incorporated herein by reference.

BACKGROUND OF THE INVENTION

Field of the Invention

The present invention relates to a vehicle. More specifically, the present invention relates to a vehicle provided with an electric power generation device generating electric power by using the power of an engine, an electric power storage device, and an external electric power supply device supplying external equipment outside the car with electric power in an electric power line interconnecting the electric power generation device and the electric power storage device.

Related Art

Japanese Unexamined Patent Application, Publication No. 2013-184642 discloses a hybrid vehicle provided with a generator generating electric power by using the power of an engine, a battery storing the electric power generated by the generator, and an external electric power supply device connecting the generator and the battery to external equipment and supplying the external equipment with the electric power generated by the generator or electric power discharged from the battery. Vehicles provided with such external electric power supply devices are highly convenient in that the vehicles allow electrical equipment such as large heating and household appliances to be used under environments where no electric power supply is available during disasters or outdoor leisure activities.

The required electric power in the external equipment appropriately varies with user operation. In this regard, in the vehicle disclosed in Japanese Unexamined Patent Application, Publication No. 2013-184642, electric power corresponding to the required electric power is supplied to the external equipment by battery charging-discharging amount adjustment. In the vehicle disclosed in Japanese Unexamined Patent Application, Publication No. 2013-184642, the engine is started and the battery is charged with the electric power generated by the generator in a case where the remaining capacity of the battery is insufficient.

SUMMARY OF THE INVENTION

Engine operation and electric power generation during external electric power supply result in engine vibration or engine noise, yet engine vibration or engine noise during external electric power supply is inadequately studied in Japanese Unexamined Patent Application, Publication No. 2013-184642. When the required electric power of the external equipment increases, for example, the engine vibration or the engine noise increases correspondingly, and then a user may feel some discomfort.

The present invention has been made to solve the above problems, and an object of the present invention is to provide a vehicle in which an increase or fluctuations in engine vibration or engine noise during external electric power supply can be suppressed.

(1) A vehicle (such as a vehicle V to be described later) includes an electric power generation device (such as an engine E, a generator G, and a second inverter 22 to be described later) including an engine (such as the engine E to be described later) and a generator (such as the generator G to be described later) that generates electric power by using power of the engine, an electric power storage device (such as a battery 3 to be described later) that is connected to the electric power generation device via an electric power line (such as a main electric power line 2 to be described later) and stores electric power generated by the electric power generation device, an external electric power supply device (such as an external electric power supply device 5 to be described later) that interconnects the electric power line and external equipment (such as external equipment 9 to be described later) and supplies the external equipment with electric power in the electric power line, and a controller (such as an electronic control unit 7 and an FI-ECU 71 and an MOT-ECU 72 of the electronic control unit 7 to be described later) that controls charging and discharging of the electric power generation device and the electric power storage device during external electric power supply by the external electric power supply device. The controller starts the engine and supplies electric power generated by the generator to the electric power storage device and the external equipment in a case where a remaining capacity (such as a battery SOC to be described later) of the electric power storage device is equal to or less than a predetermined first remaining capacity (such as a use lower limit SOC to be described later). The controller supplies the external equipment with electric power discharged from the electric power storage device in a case where the remaining capacity of the electric power storage device exceeds a second remaining capacity (such as a use upper limit SOC to be described later) exceeding the first remaining capacity. The controller executes fixed point control for controlling the engine such that an engine rotation speed is maintained constant while the generator generates electric power.

(2) In this case, it is preferable that the controller controls the engine and the generator so as to be maintained at engine torque set on the basis of an operation point at which a fuel consumption rate is minimized when the fixed point control is executed.

(3) In this case, it is preferable that the controller sets the first remaining capacity on the basis of an electric power storage device temperature (such as a battery temperature to be described later) as a temperature of the electric power storage device and increases the first remaining capacity as the electric power storage device temperature decreases in a case where the electric power storage device temperature is equal to or lower than a predetermined first temperature (such as a switching temperature to be described later).

(4) In this case, it is preferable that the controller sets a charging electric power limit as a limit with respect to charging electric power at a time of charging of the electric power storage device on the basis of an electric power storage device temperature (such as a battery temperature to be described later) as a temperature of the electric power storage device and executes variable control for controlling the engine and the generator such that the engine rotation speed changes in accordance with charging electric power for the electric power storage device set on the basis of the charging electric power limit in a case where the electric power storage device temperature is equal to or lower than a predetermined second temperature (such as a fixed point operation lower limit temperature to be described later).

(1) In the present invention, the controller starts the engine and supplies the electric power generated by the generator to the electric power storage device and the external equipment in a case where the remaining capacity of the electric power storage device is equal to or less than the first remaining capacity during external electric power supply. In a case where the remaining capacity of the electric power storage device exceeds the second remaining capacity, which exceeds the first remaining capacity, during external electric power supply, the controller supplies the electric power discharged from the electric power storage device to the external equipment. Here, the controller executes the fixed point control for controlling the engine such that the engine rotation speed is maintained constant while the generator generates electric power. Therefore, according to the present invention, the engine rotation speed is maintained constant irrespective of fluctuations in the electric power required by the external equipment while the generator generates electric power, and thus fluctuations in vibration or noise generated by the engine are also suppressed. In the present invention, the fixed point control is executed while the generator generates electric power, and thus the output electric power of the generator also becomes constant. Accordingly, in a case where the external equipment requires small electric power, the charging electric power for the electric power storage device increases correspondingly and the electric power storage device can be charged in a short time, and thus the burden on the engine during external electric power supply also can be reduced. In addition, the burden on an exhaust gas purification device can be reduced, engine oil consumption can be suppressed, and engine service life extension can be achieved by means of a constant engine rotation speed.

(2) In the present invention, when the fixed point control is executed, the controller controls the engine and the generator so as to be maintained at the engine torque set on the basis of the operation point at which the fuel consumption rate is minimized. Therefore, according to the present invention, the generator is capable of continuously generating electric power while the engine continuously operates at the operation point at which the fuel consumption rate is minimized, and thus fuel consumption during external electric power supply can be suppressed.

(3) The discharging performance of the electric power storage device declines as the temperature of the electric power storage device decreases. More specifically, the use lower limit remaining capacity of the electric power storage device increases as the temperature of the electric power storage device decreases. Here, the use lower limit remaining capacity is the minimum remaining capacity that needs to be reserved so that predetermined required discharging electric power (such as several kilowatts) is continuously discharged from the electric power storage device. In other words, the electric power storage device is incapable of continuously discharging the required discharging electric power once the remaining capacity falls below the use lower limit remaining capacity. In contrast, in the present invention, the controller increases the first remaining capacity as the electric power storage device temperature decreases when the electric power storage device temperature is a low temperature that is equal to or lower than the first temperature. Therefore, according to the present invention, the electric power storage device can be charged before the remaining capacity of the electric power storage device falls below the use lower limit remaining capacity at a low temperature at which the use lower limit remaining capacity increases as described above, and thus a remaining capacity required for continuous discharging of the required discharging electric power can be reserved for the electric power storage device.

(4) The charging performance of the electric power storage device declines as the temperature of the electric power storage device decreases. More specifically, the charging electric power limit of the electric power storage device approaches 0 as the temperature of the electric power storage device decreases. Here, the charging electric power limit is a limit with respect to the charging electric power at a time of charging of the electric power storage device. In other words, the electric power storage device may deteriorate when the electric power storage device is continuously supplied with charging electric power exceeding the charging electric power limit. In contrast, in the present invention, the controller causes the charging electric power limit to approach 0 as the electric power storage device temperature decreases when the electric power storage device temperature is a low temperature that is equal to or lower than the second temperature. In addition, the controller executes the variable control for controlling the engine and the generator such that the engine rotation speed changes in accordance with the charging electric power for the electric power storage device set on the basis of the charging electric power limit in a case where the electric power storage device temperature is equal to or lower than the second temperature at which the charging electric power limit approaches 0. As a result, at a low temperature at which the charging performance of the electric power storage device declines, it is possible to charge the electric power storage device while preventing overcharging that promotes malfunction or deterioration of the electric power storage device.

DETAILED DESCRIPTION OF THE INVENTION

First Embodiment

Hereinafter, a first embodiment of the present invention will be described with reference to accompanying drawings.

Figure 1:
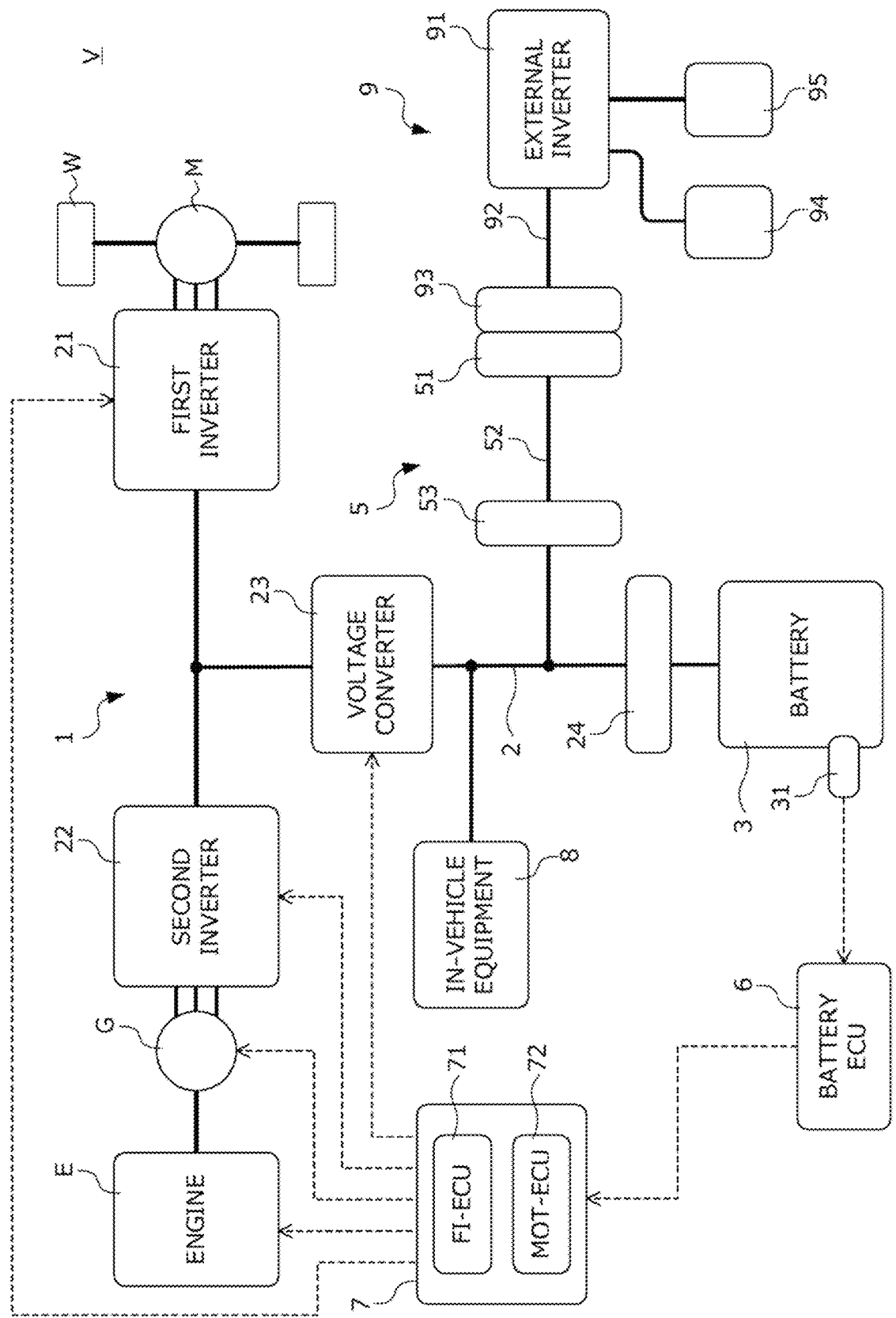
FIG. 1 is a diagram illustrating the configuration of a vehicle according to a first embodiment of the present invention.

FIG. 1 is a diagram illustrating the configuration of a vehicle V according to the present embodiment. The vehicle V is a so-called hybrid vehicle provided with a motor generator M, an internal combustion engine E (hereinafter, referred to as "engine E"), and a generator G. FIG. 1 illustrates the configurations of the vehicle V and external equipment 9 connected to the vehicle V and driven by electric power supplied from the vehicle V.

The vehicle V is provided with a drive wheel W, the motor generator M, the engine E, the generator G, an electric power supply system 1, and an electronic control unit 7 comprehensively controlling the motor generator M, the engine E, the generator G, in-vehicle equipment 8, and the electric power supply system 1.

The electronic control unit 7 is provided with an FI-ECU 71 and an MOT-ECU 72, which are microcomputers capable of communicating with each other. The FI-ECU 71 mainly controls the engine E. The MOT-ECU 72 mainly controls the motor generator M, the generator G, the in-vehicle equipment 8, and the electric power supply system 1.

The motor generator M mainly generates power for traveling of the vehicle V. The motor generator M has an output shaft connected to the drive wheel W. The torque that is generated by electric power being supplied from the electric power supply system 1 to the motor generator M and the motor generator M being caused to perform power running is transmitted to the drive wheel W via a power transmission mechanism (not illustrated), and then the drive wheel W is rotated and the vehicle V travels. In addition, the motor generator M acts as a generator by being caused to perform regenerative operation during deceleration of the vehicle V. The electric power that the motor generator M generates during the regenerative operation is supplied to the electric power supply system 1.

A crankshaft as an output shaft of the engine E is connected to the generator G via a power transmission mechanism (not illustrated). The generator G generates electric power by being driven by the power that is generated by the engine E. The electric power that is generated by the generator G is supplied to the electric power supply system 1.

The electric power supply system 1 is provided with a first inverter 21 connected to the motor generator M, a second inverter 22 connected to the generator G, a battery 3 connected to the inverters 21 and 22 via a main electric power line 2 and storing the electric power that is generated by the motor generator M and the generator G, a voltage converter 23 provided on the main electric power line 2, an external electric power supply device 5 interconnecting the main electric power line 2 and the external equipment 9 and supplying the external equipment 9 with the electric power in the main electric power line 2, and a battery ECU 6 as an electronic control unit monitoring the state of the battery 3.

The battery 3 is a secondary battery capable of performing both discharging for converting chemical energy into electric energy and charging for converting electric energy into chemical energy. Although a case where a so-called lithium ion storage battery performing charging and discharging by lithium ions moving between electrodes is used as the battery 3 will be described below, the present invention is not limited thereto.

Both positive and negative poles of the battery 3 are connected to the first inverter 21 and the second inverter 22 via the main electric power line 2. A battery contactor 24 interconnecting or disconnecting the battery 3 and the voltage converter 23 is provided between the voltage converter 23 and the battery 3 on the main electric power line 2.

The battery contactor 24 is opened or closed in accordance with a command signal transmitted from the battery ECU 6. Once the battery contactor 24 is opened, the battery 3 is disconnected from the voltage converter 23 and the external electric power supply device 5 and the battery 3 becomes incapable of performing charging and discharging. Once the battery contactor 24 is closed, the battery 3 is connected to the voltage converter 23 and the external electric power supply device 5 and the battery 3 becomes capable of performing charging and discharging.

The battery 3 is provided with a battery sensor unit 31 for estimating the internal state of the battery 3. A plurality of sensors constitutes the battery sensor unit 31, and the sensors detect physical quantities necessary for acquiring the remaining capacity of the battery 3, the temperature of the battery 3, and so on in the battery ECU 6 and transmit signals corresponding to detected values to the battery ECU 6. More specifically, the battery sensor unit 31 is constituted by, for example, a voltage sensor detecting the terminal voltage of the battery 3, a current sensor detecting a current flowing through the battery 3, and a temperature sensor detecting the temperature of the battery 3. The battery ECU 6 calculates a battery SOC [%] expressing the remaining capacity of the battery 3 as a percentage on the basis of a known algorithm using the detected value that is transmitted from the battery sensor unit 31. In addition, the battery ECU 6 acquires a battery temperature [° C.], which is the temperature of the battery 3, on the basis of the detected value that is transmitted from the battery sensor unit 31. Information relating to the battery SOC and the battery temperature acquired in the battery ECU 6 as described above is transmitted to the FI-ECU 71 and the MOT-ECU 72 by CAN communication (not illustrated).

The first inverter 21 is a pulse width modulation-based PWM inverter and is provided with a bridge circuit configured by bridge connection of a plurality of switching elements (such as IGBTs) driven in accordance with a gate drive signal generated by a gate drive circuit (not illustrated) of the MOT-ECU 72. The first inverter 21 has a direct current input-output side connected to the voltage converter 23 via the main electric power line 2. The first inverter 21 has an alternating current input-output side connected to respective coils of the U, V, and W phases of the motor generator M. During the power running of the motor generator M, the first inverter 21 generates a driving force by operating under the gate drive signal from the gate drive circuit, converting the direct current that is applied from the main electric power line 2 to the direct current input-output side into a three-phase alternating current, and supplying the three-phase alternating current to the motor generator M. During the regenerative operation of the motor generator M, the first inverter 21 operates under the gate drive signal from the gate drive circuit, converts the three-phase alternating current that is applied from the motor generator M to the alternating current input-output side into a direct current, and supplies the direct current to the main electric power line 2.

The second inverter 22 is a pulse width modulation-based PWM inverter and is provided with a bridge circuit configured by bridge connection of a plurality of switching elements (such as IGBTs) driven in accordance with the gate drive signal generated by the gate drive circuit (not illustrated) of the MOT-ECU 72. The second inverter 22 has a direct current output side connected to the voltage converter 23 via the main electric power line 2. The second inverter 22 has an alternating current input side connected to respective coils of the U, V, and W phases of the generator G. During electric power generation by the generator G using the power generated by the engine E, the second inverter 22 operates under the gate drive signal from the gate drive circuit, converts the three-phase alternating current that is applied from the generator G to the alternating current input side into a direct current, and supplies the direct current to the main electric power line 2. The engine E, the generator G, the second inverter 22, and so on constitute an electric power generation device according to the present invention.

The voltage converter 23 is, for example, a bidirectional DC-DC converter provided with a plurality of switching elements (such as IGBTs) driven by the gate drive signal generated by the gate drive circuit (not illustrated) of the MOT-ECU 72. The voltage converter 23 operates under the gate drive signal from the gate drive circuit. In a case where the motor generator M is driven with the electric power that is discharged from the battery 3, the voltage converter 23 boosts the voltage of the direct current supplied from the battery 3, supplies the direct current to the first inverter 21, and allows a current flow from the battery 3 side to the first inverter 21 side. In a case where the battery 3 is charged with the electric power that is generated by the generator G and the motor generator M and in a case where the electric power that is generated by the generator G during external electric power supply is supplied to the battery 3, the in-vehicle equipment 8, and the external equipment 9, the voltage converter 23 steps down the voltage of the direct current supplied from the inverters 21 and 22, supplies the direct current to the battery 3, and allows a current flow from the inverter 21 side and the inverter 22 side to the battery 3 side.

The in-vehicle equipment 8 is connected between the voltage converter 23 and the battery contactor 24 on the main electric power line 2. The in-vehicle equipment 8 is electrical equipment driven by the electric power in the main electric power line 2. Examples of the in-vehicle equipment 8 include air-conditioning equipment and acoustic equipment. The in-vehicle equipment 8 can become an internal load consuming the electric power discharged from the battery 3 or the electric power generated by the generator G during external electric power supply.

The external electric power supply device 5 is provided with an inlet 51 to which an external electric power supply connector 93 of the external equipment 9 can be connected, an external electric power supply electric power line 52 interconnecting the inlet 51 and the main electric power line 2, and an external electric power supply contactor 53 provided on the external electric power supply electric power line 52. The external electric power supply device 5 supplies the external equipment 9 with the electric power of the direct current in the main electric power line 2 when the vehicle V is stopped.

The external electric power supply electric power line 52 is connected between the voltage converter 23 and the battery contactor 24 on the main electric power line 2. Accordingly, the direct current electric power discharged from the battery 3 and the direct current electric power generated by the generator G when the vehicle V is stopped and stepped down by the voltage converter 23 are supplied to the external equipment 9 via the external electric power supply electric power line 52 and the inlet 51.

The external electric power supply contactor 53 is opened or closed in accordance with a command signal transmitted from the MOT-ECU 72. Once the external electric power supply contactor 53 is opened, the inlet 51 and the main electric power line 2 are disconnected and external electric power supply becomes incapable of being performed. Once the external electric power supply contactor 53 is closed, the inlet 51 and the main electric power line 2 are interconnected and external electric power supply becomes capable of being performed.

The external equipment 9 is provided with an external inverter 91 converting a direct current into a single-phase alternating current, an external electric power supply cable 92 interconnecting the vehicle V and the external inverter 91, and a plurality of electrical equipment 94 and 95 connected to the external inverter 91 (examples of the electrical equipment 94 and 95 including a heating device and a rice cooker outside a car and a portable terminal used in a car). One end side of the external electric power supply cable 92 is connected to the external inverter 91, and the other end side of the external electric power supply cable 92 is connected to the inlet 51 via the external electric power supply connector 93. The external inverter 91 converts the direct current electric power that is supplied from the external electric power supply device 5 of the vehicle V via the external electric power supply cable 92 into a single-phase alternating current and supplies the single-phase alternating current to the electrical equipment 94 and 95. The external equipment 9 can become an external load consuming the electric power discharged from the battery 3 or the electric power generated by the generator G during external electric power supply.

The FI-ECU 71 and the MOT-ECU 72 control the engine E, the generator G, the second inverter 22, the voltage converter 23, the battery contactor 24, and the external electric power supply contactor 53 such that the electric power required in the in-vehicle equipment 8 and the external equipment 9 is supplied during external electric power supply by the external electric power supply device 5.

In a case where sufficient electric power is stored in the battery 3, the ECUs 71 and 72 supply the electric power that is discharged from the battery 3 to the in-vehicle equipment 8 and the external equipment 9. In this case, the ECUs 71 and 72 stop electric power generation by the engine E and the generator G.

In a case where the electric power that is stored in the battery 3 is insufficient, the ECUs 71 and 72 operate the engine E and supply the electric power generated by the generator G to the in-vehicle equipment 8, the external equipment 9, and the battery 3. More specifically, the ECUs 71 and 72 convert the three-phase alternating current electric power generated by the engine E and the generator G into direct current electric power by driving the second inverter 22, step down the direct current electric power output from the second inverter 22 by further driving the voltage converter 23, and supply the direct current electric power to the in-vehicle equipment 8, the external equipment 9, and the battery 3.

Here, the electric power generated by means of the engine E and the generator G can be varied by adjustment of the output of the engine E and the excitation intensity of the generator G. Accordingly, during external electric power supply by the external electric power supply device 5, the ECUs 71 and 72 are capable of controlling the engine E and the generator G under two operation modes, one being a variable electric power generation operation mode and the other being a fixed point electric power generation operation mode. The variable electric power generation operation mode is an operation mode in which the electric power generated by the engine E and the generator G is actively varied in accordance with the electric power required by the in-vehicle equipment 8 and the external equipment 9. The fixed point electric power generation operation mode is an operation mode in which the electric power generated by the engine E and the generator G is maintained constant irrespective of the electric power required by the in-vehicle equipment 8 and the external equipment 9.

Figure 2:
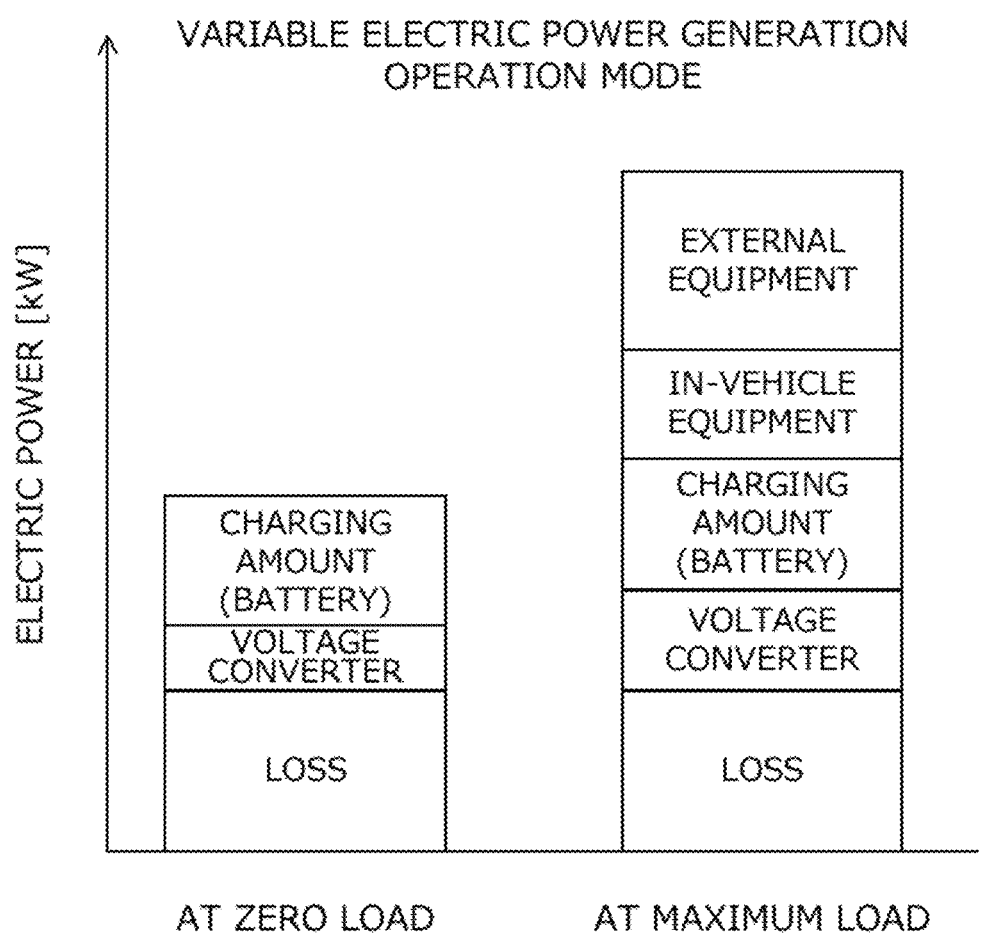
FIG. 2 is a diagram illustrating a breakdown of generated electric power and consumed electric power in a variable electric power generation operation mode.

FIG. 2 is a diagram illustrating a breakdown of generated electric power and consumed electric power in the variable electric power generation operation mode. In FIG. 2, the left side illustrates generated electric power at a time of zero load when the consumed electric power in the in-vehicle equipment 8 and the external equipment 9 is 0 and the right side illustrates generated electric power at a time of maximum load when the consumed electric power in the in-vehicle equipment 8 and the external equipment 9 is at its maximum.

As illustrated on the right side of FIG. 2, the electric power generated by the generator G during external electric power supply is consumed mainly in the external equipment 9, the in-vehicle equipment 8, the battery 3, and the voltage converter 23. In addition, part of the generated electric power is consumed by various losses. As illustrated on the left side of FIG. 2, at the time of zero load, the consumed electric power in the in-vehicle equipment 8 and the external equipment 9 becomes 0. Accordingly, in the variable electric power generation operation mode, the ECUs 71 and 72 decrease the electric power generated by the engine E and the generator G by the decrease in the passing electric power of the voltage converter 23 and the consumed electric power in the in-vehicle equipment 8 and the external equipment 9 such that the charging electric power for the battery 3 at the maximum load and the charging electric power for the battery 3 at the zero load are substantially equal to each other.

Figure 3:
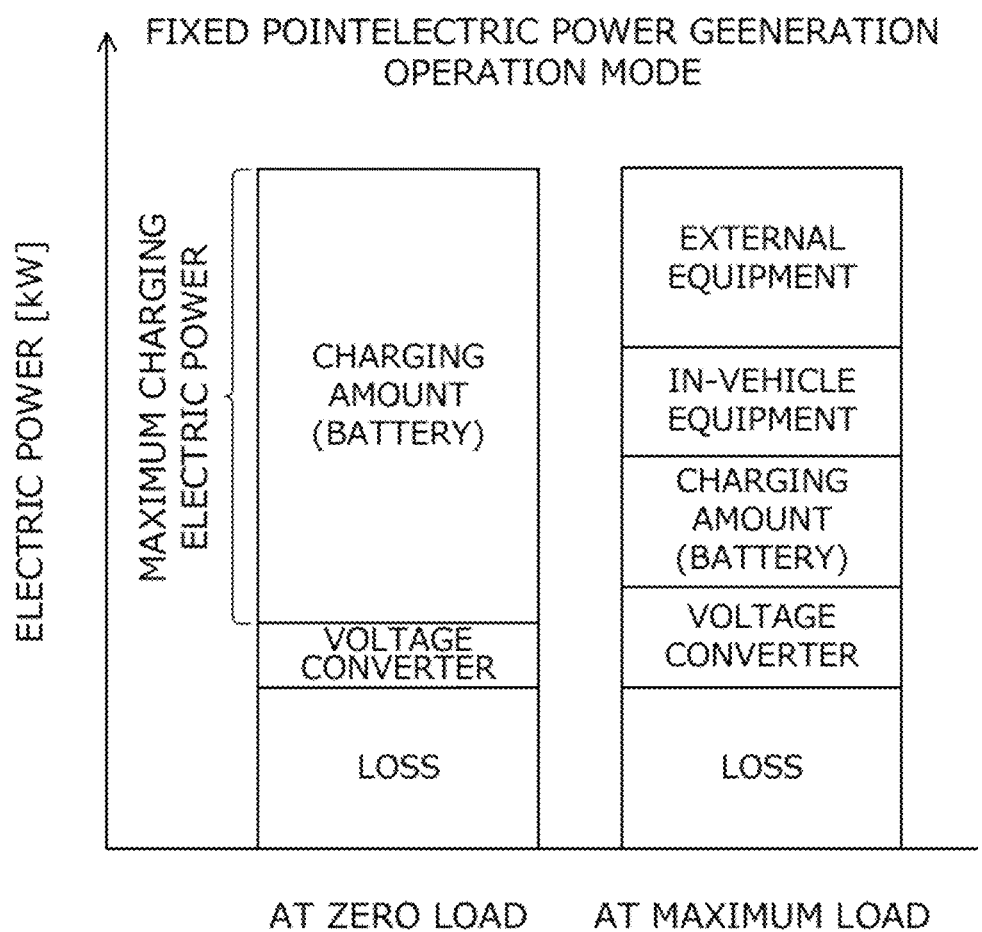
FIG. 3 is a diagram illustrating a breakdown of generated electric power and consumed electric power in a fixed point electric power generation operation mode.

FIG. 3 is a diagram illustrating a breakdown of generated electric power and consumed electric power in the fixed point electric power generation operation mode. In FIG. 3, the left side illustrates generated electric power at a time of zero load and the right side illustrates generated electric power at a time of maximum load as in FIG. 2.

As illustrated in FIG. 3, in the fixed point electric power generation operation mode, the ECUs 71 and 72 control the engine E and the generator G such that the generated electric power becomes constant irrespective of whether the current load is the maximum load or the zero load, that is, irrespective of the consumed electric power in the in-vehicle equipment 8 and the external equipment 9. Accordingly, at the zero load as compared with the maximum load, the consumed electric power in the in-vehicle equipment 8 and the external equipment 9 decreases and the charging electric power of the battery 3 increases by the amount by which the passing electric power of the voltage converter 23 decreases.

Accordingly, the charging time of the battery 3 in the variable electric power generation operation mode is constant irrespective of the consumed electric power in the in-vehicle equipment 8 and the external equipment 9. The charging time of the battery 3 in the fixed point electric power generation operation mode changes in accordance with the consumed electric power of the in-vehicle equipment 8 and the external equipment 9. More specifically, the charging time of the battery 3 shortens as the consumed electric power of the in-vehicle equipment 8 and the external equipment 9 decreases. Accordingly, the charging time of the battery 3 in the fixed point electric power generation operation mode is always shorter than the charging time of the battery 3 in the variable electric power generation operation mode. Accordingly, the electric power generation period (that is, the operation time of the engine E) in the fixed point electric power generation operation mode is shorter than the electric power generation period in the variable electric power generation operation mode.

Figure 4:
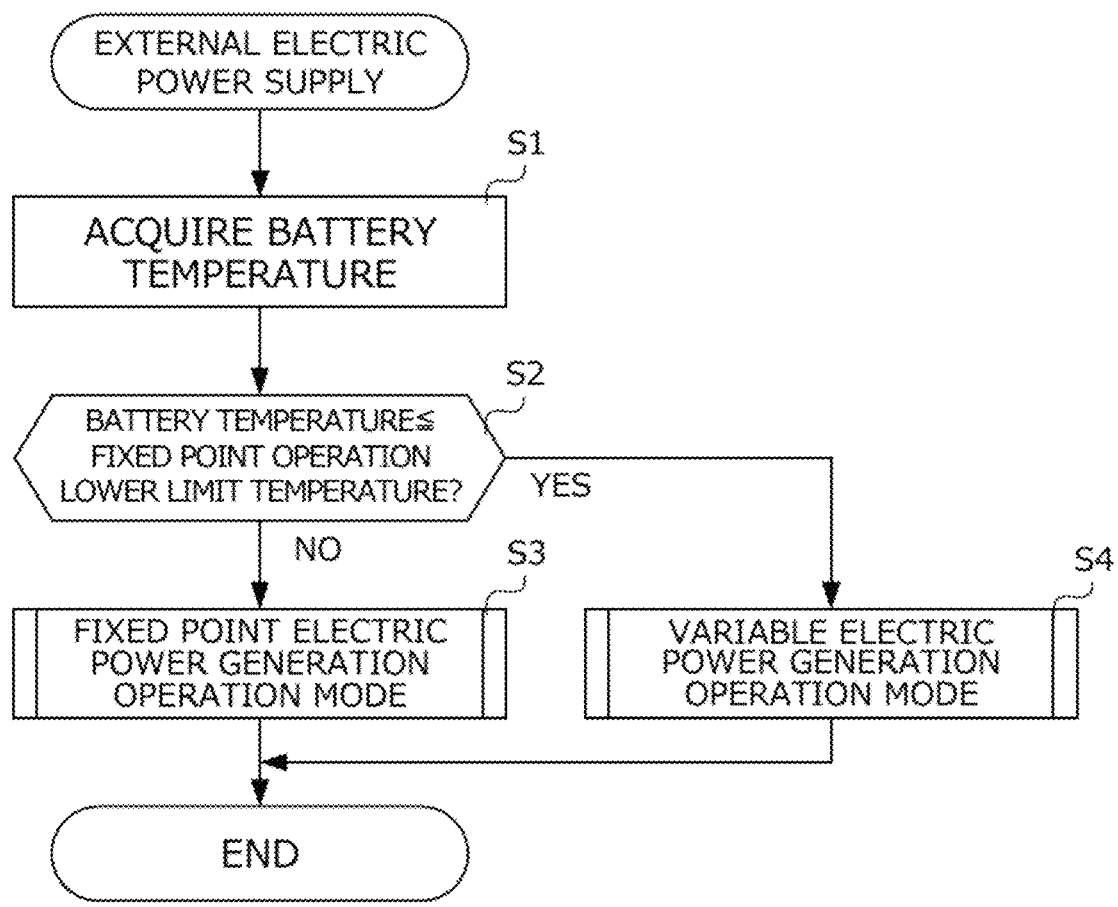
FIG. 4 is a flowchart illustrating a specific procedure of external electric power supply processing.

FIG. 4 is a flowchart illustrating a specific procedure of external electric power supply processing in the ECUs 71 and 72. The external electric power supply processing of FIG. 4 is repeatedly executed at a predetermined control cycle in the ECUs 71 and 72 as a power switch (not illustrated) in the vehicle V is turned ON and a power switch (not illustrated) in the external inverter 91 is turned ON after the external electric power supply connector 93 is connected to the inlet 51 while vehicle V remains stopped.

First, in S1, the ECUs 71 and 72 acquire the battery temperature from the battery ECU 6. Next, in S2, the ECUs 71 and 72 determine whether or not the acquired battery temperature is equal to or lower than a predetermined fixed point operation lower limit temperature.

In a case where the determination result in S2 is NO, the ECUs 71 and 72 proceed to S3, perform external electric power supply under the fixed point electric power generation operation mode (see FIG. 6 to be described later), and terminate the processing of FIG. 4. In a case where the determination result in S2 is YES, the ECUs 71 and 72 determine that no external electric power supply can be executed under the fixed point electric power generation operation mode, proceed to S4, and perform external electric power supply under the variable electric power generation operation mode.

The operation mode is switched in accordance with the battery temperature, as in the processing of FIG. 4, for the reason to be described below with reference to FIG. 5.

Figure 5:
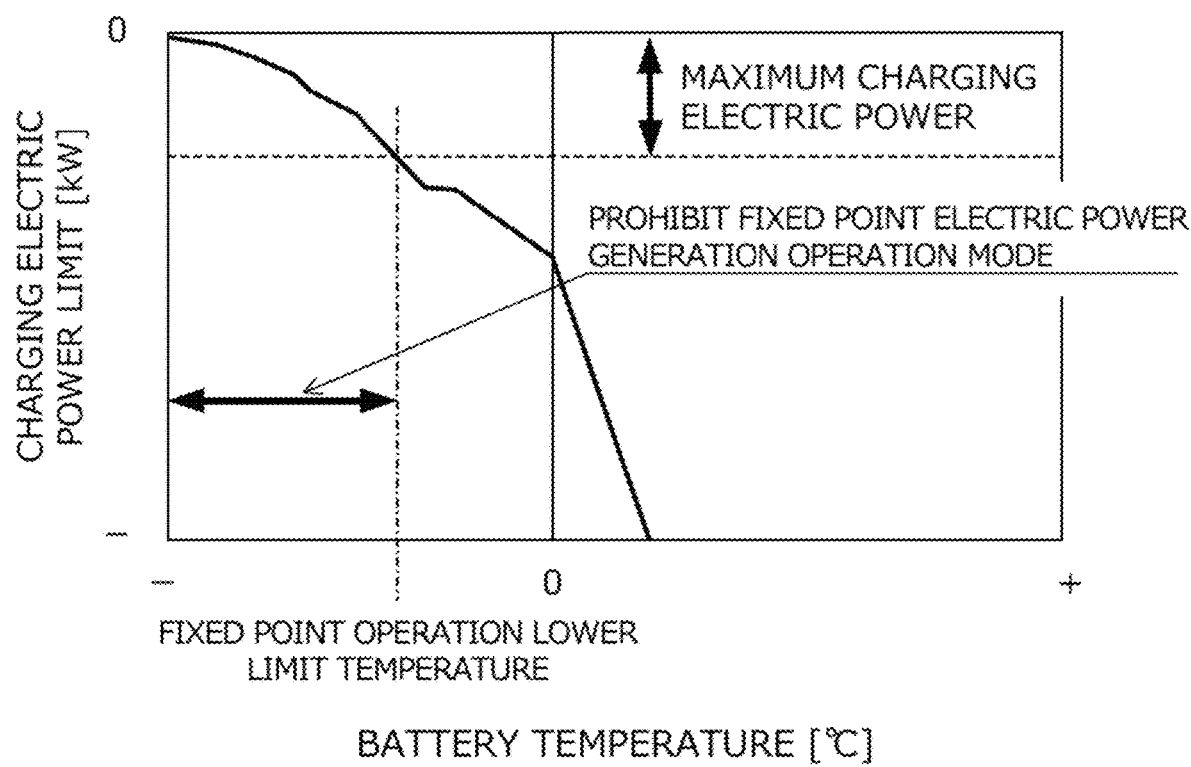
FIG. 5 is a diagram illustrating the temperature characteristics of the charging performance of a battery.

FIG. 5 is a diagram illustrating the temperature characteristics of the charging performance of the battery 3. In FIG. 5, the horizontal axis represents the battery temperature [° C.] and the vertical axis represents the charging electric power limit [kW] of the battery 3. The charging performance of the battery 3 declines as the battery temperature decreases. More specifically, the charging electric power limit, which is a limit with respect to the charging electric power at a time of charging of the battery 3, approaches 0 as the battery temperature decreases. In other words, the battery 3 may deteriorate when the battery 3 is continuously supplied with charging electric power exceeding the charging electric power limit.

As described with reference to FIGS. 2 and 3, the charging electric power of the battery 3 is constant, irrespective of a load, while external electric power supply is performed under the variable electric power generation operation mode. In contrast, the charging electric power of the battery 3 varies with a load while external electric power supply is performed under the fixed point electric power generation operation mode. In addition, the charging electric power of the battery 3 during the external electric power supply under the fixed point electric power generation operation mode is maximized at a zero load. Hereinafter, the maximum value of the charging electric power of the battery 3 during the external electric power supply under the fixed point electric power generation operation mode will be referred to as maximum charging electric power. In other words, during the external electric power supply under the fixed point electric power generation operation mode, the battery 3 may be continuously supplied with the maximum charging electric power.

As illustrated in FIG. 5, the charging electric power limit becomes smaller than the maximum charging electric power in a case where the battery temperature is equal to or lower than the fixed point operation lower limit temperature defined as 0° C. or less. In other words, in a case where the battery temperature is equal to or lower than the fixed point operation lower limit temperature, the battery 3 may deteriorate once the maximum charging electric power is continuously supplied to the battery 3. Accordingly, the ECUs 71 and 72 execute external electric power supply under the fixed point electric power generation operation mode in a case where the battery temperature is higher than the fixed point operation lower limit temperature (see S3 of FIG. 4) and prohibit the fixed point electric power generation operation mode and execute external electric power supply under the variable electric power generation operation mode in a case where the battery temperature is equal to or lower than the fixed point operation lower limit temperature (see S4 of FIG. 4).

Figure 6:
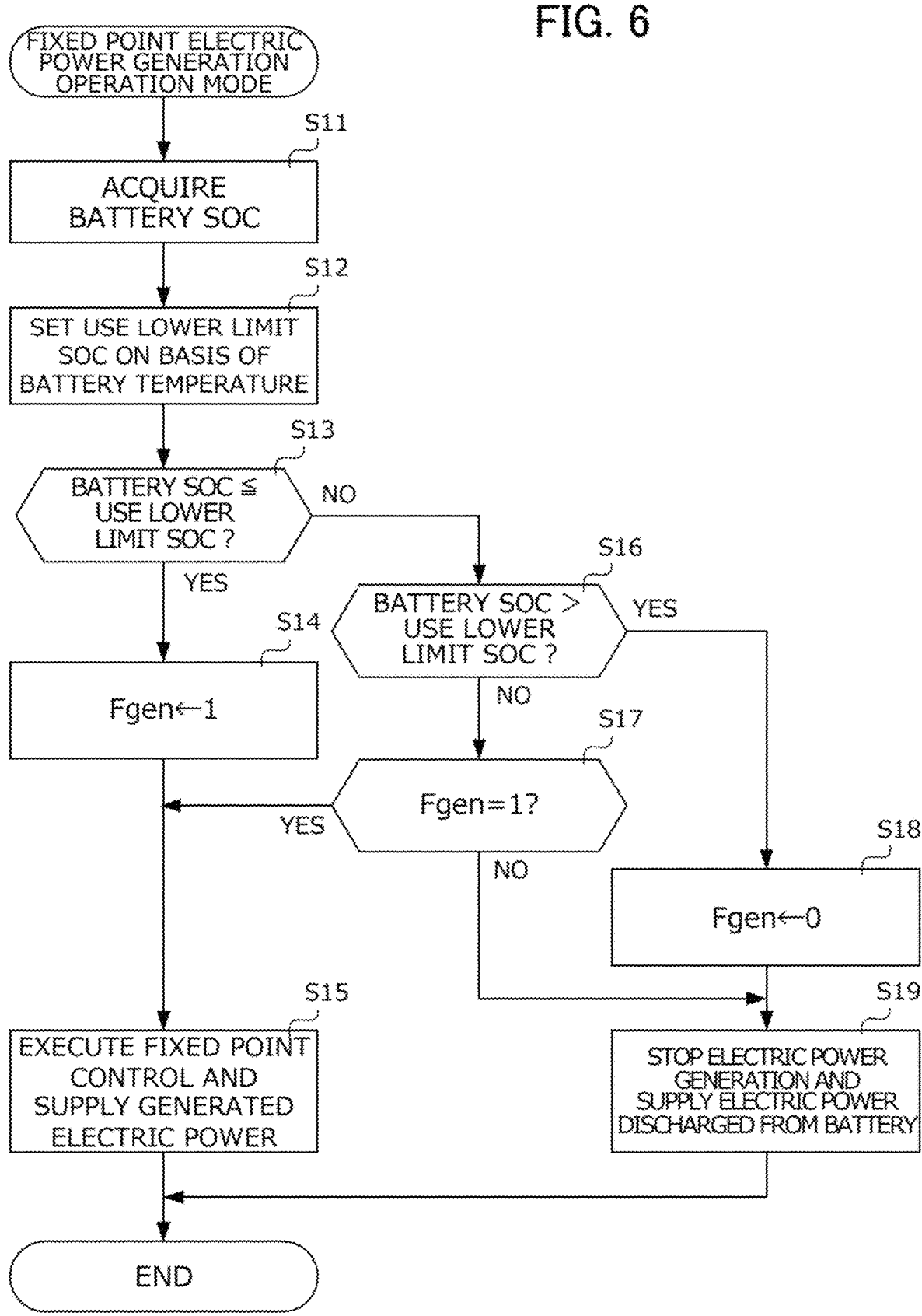
FIG. 6 is a flowchart illustrating a specific procedure of external electric power supply processing in the fixed point electric power generation operation mode.

FIG. 6 is a flowchart illustrating a specific procedure of external electric power supply processing in the fixed point electric power generation operation mode.

First, in S11, the ECUs 71 and 72 acquire the battery SOC from the battery ECU 6. Next, in S12, the ECUs 71 and 72 set a use lower limit SOC, which is a threshold with respect to the battery SOC, on the basis of the battery temperature acquired in S1 of FIG. 4. More specifically, the ECUs 71 and 72 set the use lower limit SOC by searching a map as exemplified in FIG. 7A on the basis of the battery temperature. According to the map of FIG. 7A, the use lower limit SOC is set to a constant value irrespective of the battery temperature, more specifically, to a high temperature lower limit SOC indicated by a thick broken line 7a in FIG. 7A in a case where the battery temperature is higher than a switching temperature set higher than the fixed point operation lower limit temperature (see FIG. 5). In a case where the battery temperature is equal to or lower than the switching temperature, the use lower limit SOC is set so as to increase in value as the battery temperature decreases. Details of the map of FIG. 7A will be described in detail later.

Next, in S13, the ECUs 71 and 72 determine whether or not the battery SOC acquired in S11 is equal to or less than the use lower limit SOC set in S12. In a case where the determination result of S13 is YES, the ECUs 71 and 72 set an electric power generation flag Fgen, which specifies that electric power generation by the engine E and the generator G is in progress, to "1" (see S14), and then the ECUs 71 and 72 execute fixed point control of the engine E and the generator G, supply the electric power generated by the engine E and the generator G to the in-vehicle equipment 8, the external equipment 9, and the battery 3 (see S15), and terminate this processing. The electric power generation flag Fgen is "0" immediately after the external electric power supply processing of FIG. 4 is initiated.

A specific procedure of the fixed point control of the engine E and the generator G will be described below. First, the ECUs 71 and 72 estimate the altitude of the point where the vehicle V is stopped on the basis of the detected value of an atmospheric pressure sensor (not illustrated). Next, the ECUs 71 and 72 select one corresponding to the estimated altitude from a plurality of operation point decision maps determined in advance. As exemplified in FIG. 8, the operation point decision map is a map associating engine output [kWh] (see the solid lines of FIG. 8) with operation points of the engine E characterized by an engine rotation speed [rpm] (horizontal axis of FIG. 8) and engine torque [Nm] (vertical axis of FIG. 8). The plurality of operation point decision maps is stored for each altitude in the ECUs 71 and 72. Also stored in the plurality of operation point decision maps is information relating to a BSFC bottom line indi-cating a set of operation points at which the net fuel consumption rate [g/kWh] is minimized as indicated by a thick broken line 8a.

Figure 8:
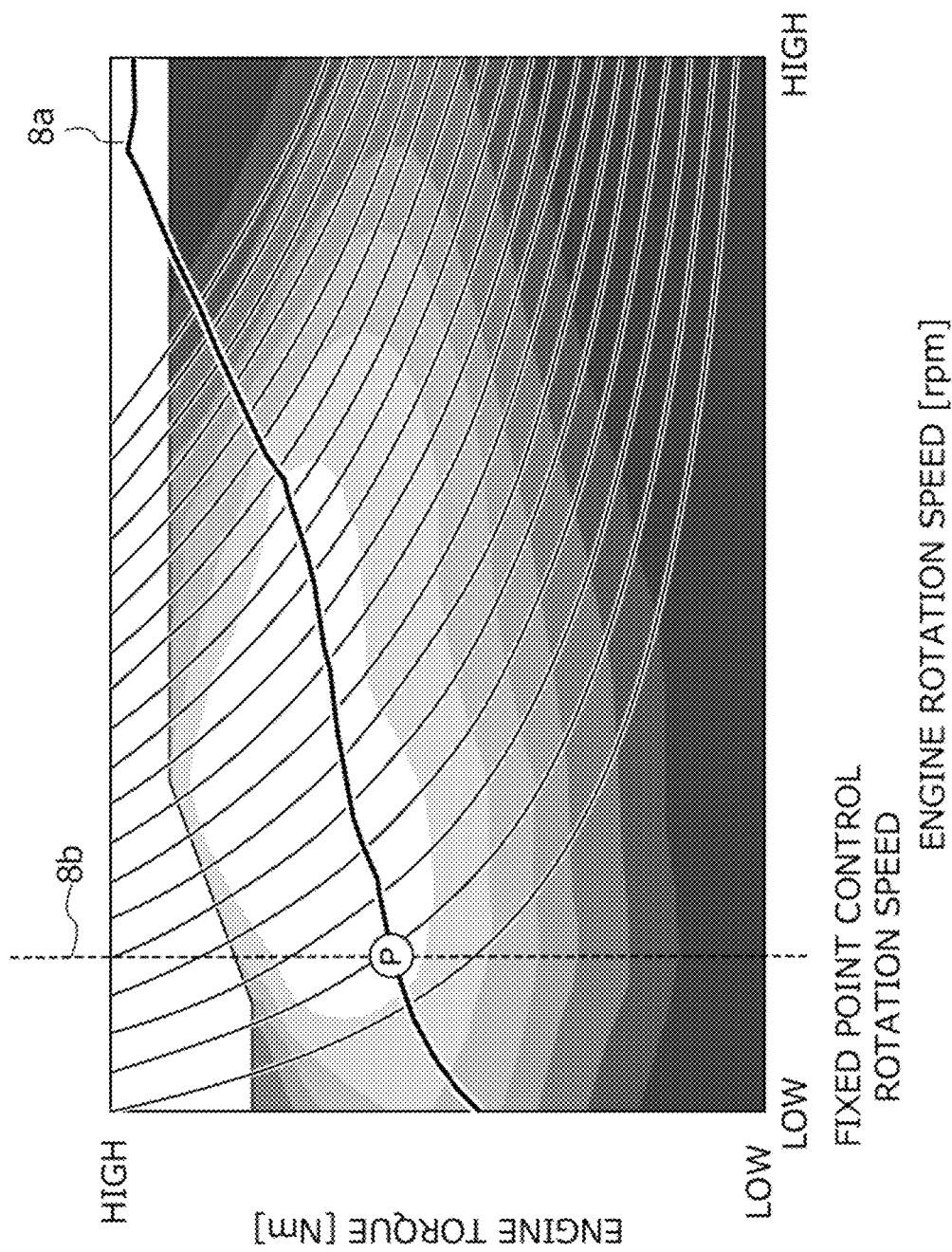
FIG. 8 is an example of an operation point decision map.

Further, the ECUs 71 and 72 calculate the engine output that minimizes the net fuel consumption rate by searching the operation point decision map selected in accordance with the altitude on the basis of a fixed point control rotation speed [rpm] determined in advance. In the example of FIG. 8, this corresponds to calculating the engine output that passes through an intersection point P between a line 8b indicating the fixed point control rotation speed and the BSFC bottom line 8a indicated by the thick broken line. The fixed point control rotation speed is an engine rotation speed determined by a procedure to be described later with reference to FIG. 9 and is constant in value irrespective of the altitude.

Further, the ECUs 71 and 72 calculate target engine torque [Nm] corresponding to a target load with respect to the engine E and target generator torque [Nm] realizing the target engine torque on the basis of the fixed point control rotation speed and the engine output calculated in advance. Further, the ECUs 71 and 72 adjust the intake air amount and the fuel injection amount of the engine E such that the calculated target engine torque is realized and adjust the excitation intensity of the generator G such that the target generator torque is realized. As a result, during the execution of the fixed point control, the engine rotation speed is maintained constant at the fixed point control rotation speed determined in advance and the engine torque is maintained constant at the target engine torque determined such that the net fuel consumption rate is minimized.

Although a case where the engine E and the generator G are controlled such that the engine torque is directly above the BSFC bottom line 8a has been described in the above fixed point control, the present invention is not limited thereto. Alternatively, in the fixed point control, the engine E and the generator G may be controlled such that the engine torque becomes close to the BSFC bottom line 8a without having to be limited to being directly above the BSFC bottom line 8a.

Returning back to FIG. 6, in a case where the determination result in S13 is NO, the ECUs 71 and 72 determine whether or not the battery SOC acquired in S11 exceeds a use upper limit SOC defined as a value exceeding the use lower limit SOC (see S16). In a case where the determination result of S16 is NO, the battery ECU 6 determines whether or not the electric power generation flag Fgen is "1" (see S17). In a case where the determination result of S17 is YES, that is, in a case where the fixed point control is in progress and the battery SOC is yet to reach the use upper limit SOC, the ECUs 71 and 72 proceed to S15 in order to continue charging the battery 3 and execute the fixed point control of the engine E and the generator G.

In a case where the determination result in S16 is YES, the ECUs 71 and 72 set the electric power generation flag Fgen to "0" (see S18), and then the ECUs 71 and 72 stop the operation of the engine E and the electric power generation by the generator G, supply the in-vehicle equipment 8 and the external equipment 9 with the electric power discharged from the battery 3 (see S19), and terminate this processing. In a case where the determination result of S17 is NO, that is, in a case where discharging of the battery 3 is in progress and the battery SOC is yet to reach the use upper limit SOC, the ECUs 71 and 72 proceed to S19 in order to continue discharging the battery 3 and stop the operation of the engine E and the electric power generation by the generator G.

Figure 7A:
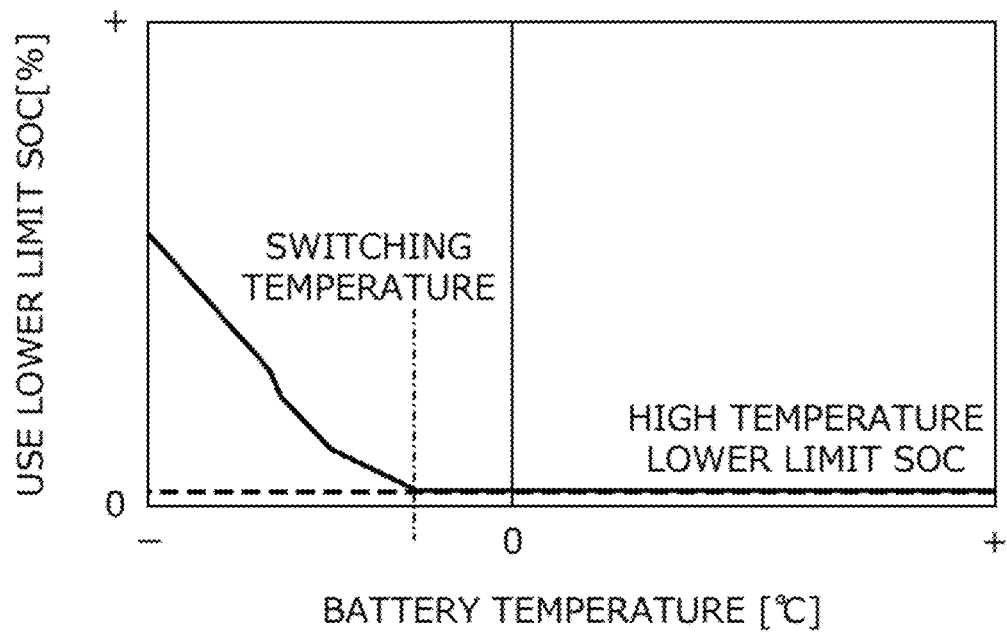
FIG. 7A is a diagram illustrating an example of a use lower limit SOC decision map for decision of a use lower limit SOC in accordance with a battery temperature.

The map of FIG. 7A will be described in detail below. FIG. 7A is a diagram illustrating an example of a use lower limit SOC decision map for decision of the use lower limit SOC in accordance with the battery temperature. In FIG. 7A, the horizontal axis represents the battery temperature and the vertical axis represents the use lower limit SOC.

According to the flowchart illustrated in FIG. 6, the fixed point control of the engine E and the generator G is executed and the battery 3 is charged with the electric power generated by the generator G as a result once the battery SOC of the battery 3 falls below the use lower limit SOC during external electric power supply. In other words, the electric power required by the in-vehicle equipment 8 and the external equipment 9 needs to be covered by the electric power discharged from the battery 3 while the battery SOC exceeds the use lower limit SOC. In other words, the battery 3 needs to be in a state where the battery 3 is capable of continuously supplying electric power equal to or greater than required discharging electric power determined in view of, for example, various losses or the electric power required by the in-vehicle equipment 8 and the external equipment 9 while the battery SOC exceeds the use lower limit SOC.

Figure 7B:
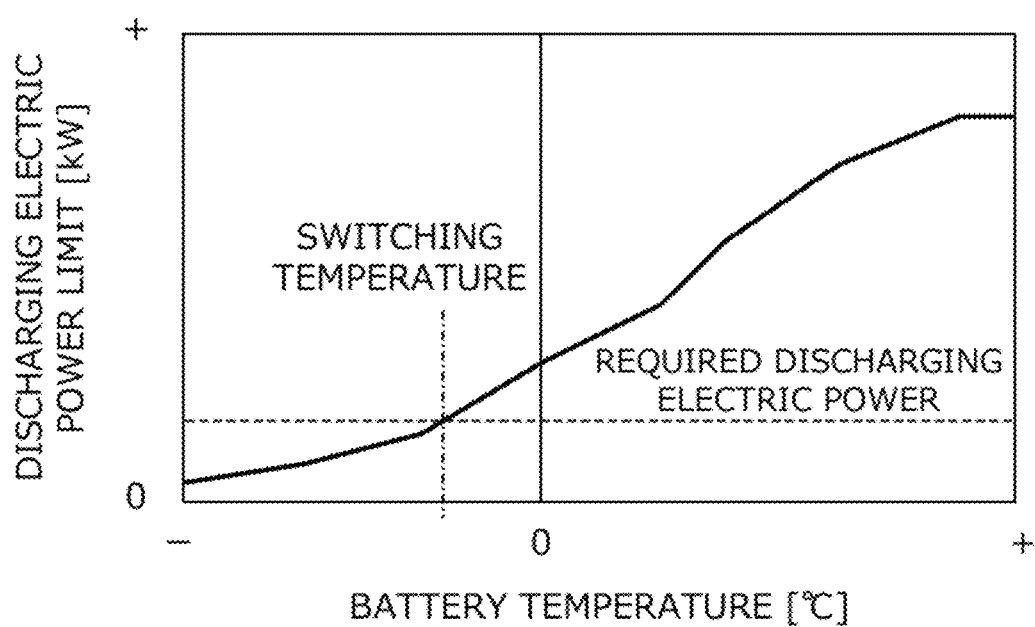
FIG. 7B is a diagram illustrating the temperature characteristics of the discharging performance of the battery.

FIG. 7B is a diagram illustrating the temperature characteristics of the discharging performance of the battery 3. More specifically, FIG. 7B is a diagram illustrating the temperature characteristics of the discharging performance of the battery 3 in a state where the battery SOC is the high temperature lower limit SOC (see FIG. 7A). In FIG. 7B, the horizontal axis represents the battery temperature [° C.] and the vertical axis represents the discharging electric power limit [kW] of the battery 3. The discharging performance of the battery 3 declines as the battery temperature decreases as in the case of the charging performance. More specifically, the discharging electric power limit, which is a limit with respect to the discharging electric power at a time of discharging of the battery 3, approaches 0 as the battery temperature decreases. In other words, the battery 3 is incapable of continuously discharging electric power exceeding the discharging electric power limit. Accordingly, the discharging electric power limit becomes equal to or less than the required discharging electric power in a case where the battery temperature is equal to or lower than the switching temperature as illustrated in FIG. 7B, and thus the battery 3 is incapable of continuously discharging the required discharging electric power. Accordingly, the use lower limit SOC is set so as to increase as the battery temperature decreases in a case where the battery temperature is equal to or lower than the switching temperature as illustrated in FIG. 7A.

Figure 7C:
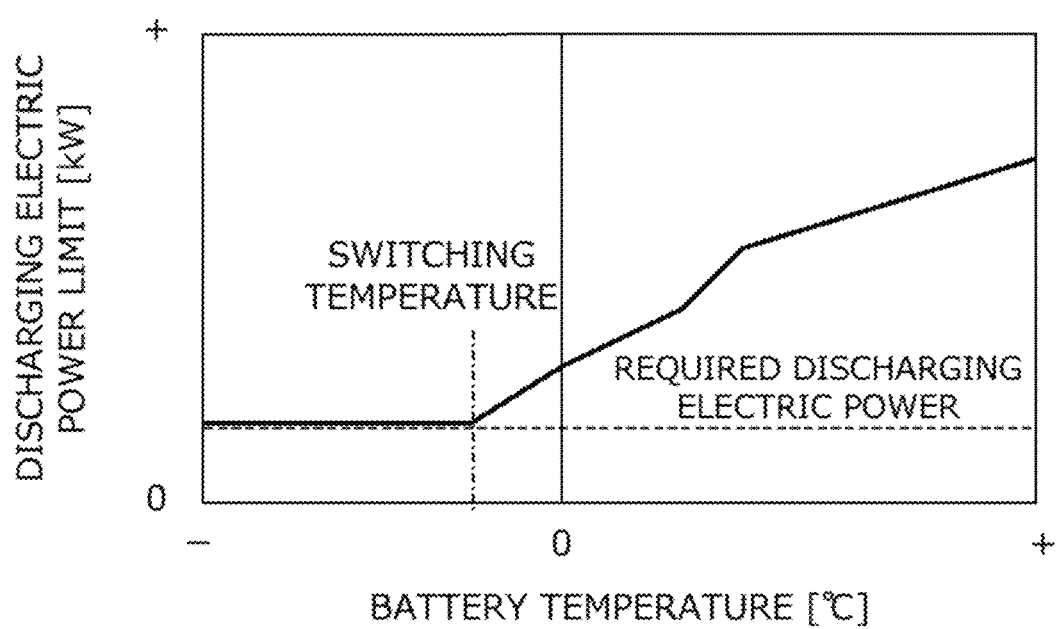
FIG. 7C is a diagram illustrating the temperature characteristics of the discharging performance of the battery.

FIG. 7C is a diagram illustrating the temperature characteristics of the discharging performance of the battery 3. More specifically, FIG. 7C is a diagram illustrating the temperature characteristics of the discharging performance of the battery 3 adjusted such that the battery SOC at each battery temperature becomes the use lower limit SOC defined by the map of FIG. 7A. In FIG. 7C, the horizontal axis represents the battery temperature [° C.] and the vertical axis represents the discharging electric power limit [kW] of the battery 3. As illustrated in FIG. 7C, the battery 3 becomes capable of continuously discharging the required discharging electric power by the battery SOC being reserved so as to reach at least the use lower limit SOC.

Figure 9:
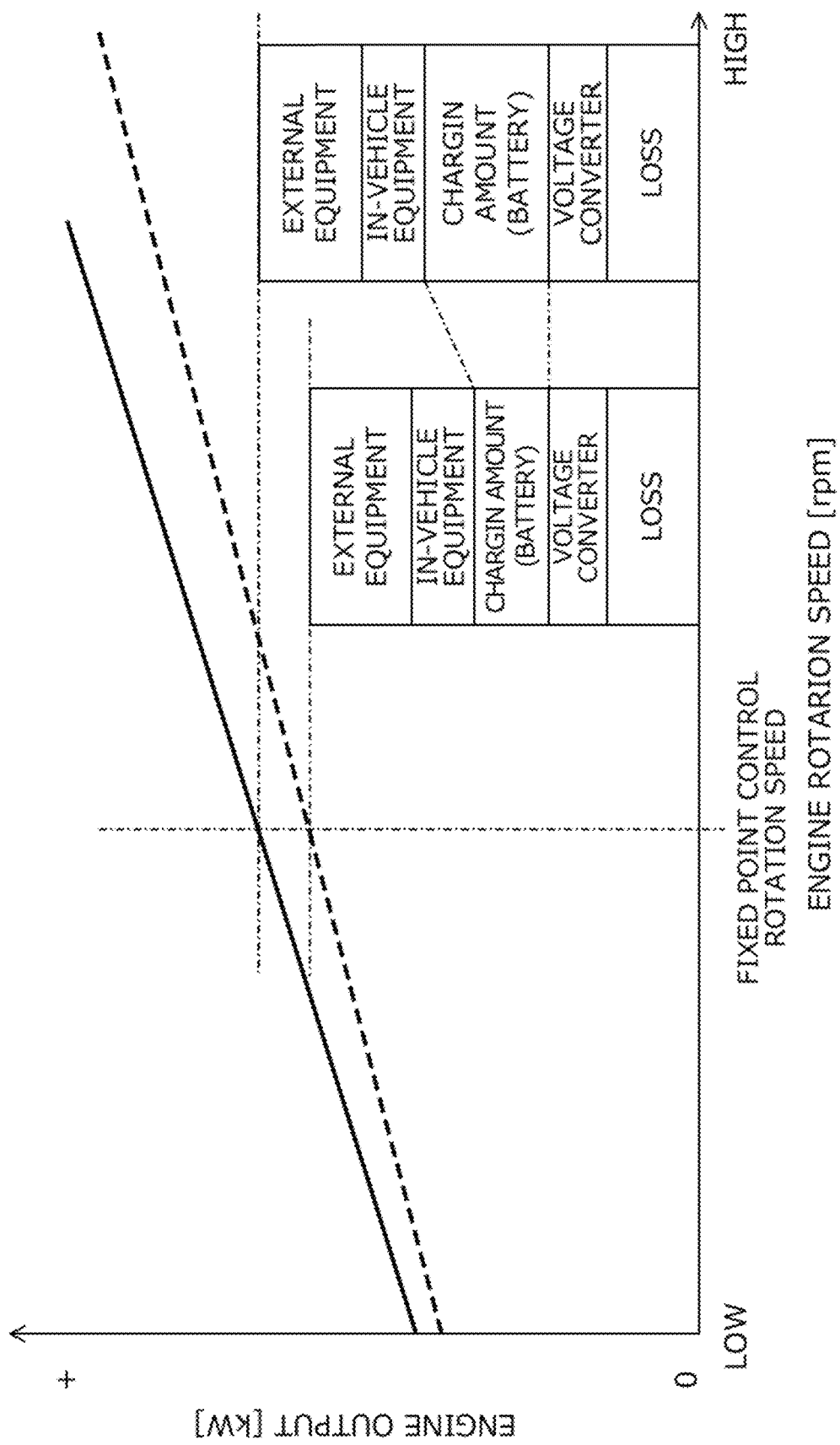
FIG. 9 is a diagram illustrating the relationship between an engine rotation speed and engine output during fixed point control.

Next, a procedure for setting the fixed point control rotation speed will be described with reference to FIG. 9. FIG. 9 is a diagram illustrating the relationship between the engine rotation speed and the engine output during the fixed point control. In FIG. 9, the horizontal axis represents the engine rotation speed [rpm] and the vertical axis represents the engine output [kW] at a time when the operation point of the engine E during the fixed point control is changed on the BSFC bottom line. In FIG. 9, the thick solid line indicates the engine rotation speed-engine output relationship on low ground (with an altitude of, for example, 0 [m]) and the thick broken line indicates the engine rotation speed-engine output relationship on high ground (with an altitude of, for example, 1,000 [m]).

As illustrated in FIG. 9, the engine output, that is, the generated electric power during the fixed point control increases as the engine rotation speed increases. In addition, as illustrated in FIG. 9, the engine output and the generated electric power are lower on the high ground than on the low ground. Accordingly, the fixed point control rotation speed is set to an engine rotation speed at which the electric power required at a time of the maximum load can be covered by the in-vehicle equipment 8 and the external equipment 9 even on the high ground with the high ground where the engine output decreases assumed. Once the fixed point control rotation speed is set as described above, the generated electric power becomes larger on the low ground than on the high ground. Accordingly, the increment in generated electric power on the low ground is absorbed by the increment in charging electric power for the battery 3 as illustrated in FIG. 9.

The vehicle V according to the present embodiment described above has the following effects.

(1) The ECUs 71 and 72 start the engine E and supply the electric power generated by the generator G to the battery 3 and the external equipment 9 in a case where the battery SOC is equal to or less than the use lower limit SOC during external electric power supply. In a case where the battery SOC exceeds the use upper limit SOC, which exceeds the use lower limit SOC, during external electric power supply, the ECUs 71 and 72 supply the electric power discharged from the battery 3 to the external equipment 9. Here, the ECUs 71 and 72 execute the fixed point control for controlling the engine such that the engine rotation speed is maintained constant while the generator G generates electric power. Therefore, according to the vehicle V, the engine rotation speed is maintained constant at the fixed point control rotation speed irrespective of fluctuations in the electric power required by the external equipment 9 while the generator G generates electric power, and thus fluctuations in vibration or noise generated by the engine E are also suppressed. In the vehicle V, the fixed point control is executed while the generator G generates electric power, and thus the output electric power of the generator G also becomes constant. Accordingly, in a case where the external equipment 9 requires small electric power, the charging electric power for the battery 3 increases correspondingly and the battery 3 can be charged in a short time, and thus the burden on the engine E during external electric power supply also can be reduced. In addition, the burden on an exhaust gas purification device can be reduced, engine oil consumption can be suppressed, and engine service life extension can be achieved by means of a constant engine rotation speed.

(2) When the fixed point control is executed, the ECUs 71 and 72 control the engine E and the generator G so as to be maintained at the engine torque set on the basis of the operation point at which the net fuel consumption rate is minimized (operation point directly above the BSFC bottom line). Therefore, according to the vehicle V, the generator G is capable of continuously generating electric power while the engine E continuously operates at the operation point at which the net fuel consumption rate is minimized, and thus fuel consumption during external electric power supply can be suppressed.

(3) When the battery is at a low temperature that is equal to or lower than the switching temperature, the ECUs 71 and 72 increase the use lower limit SOC as the battery temperature decreases. Therefore, according to the vehicle V, the battery 3 can be charged before the battery SOC falls below the use lower limit SOC at a low temperature at which the use lower limit SOC increases as described above, and thus a remaining capacity required for continuous discharging of the required discharging electric power can be reserved for the battery 3.

(4) When the battery is at a low temperature that is equal to or lower than a second temperature, the ECUs 71 and 72 cause the charging electric power limit to approach 0 as the battery temperature decreases. In addition, in a case where the battery temperature is equal to or lower than the fixed point operation lower limit temperature at which the charging electric power limit approaches 0, the ECUs 71 and 72 select the variable electric power generation operation mode in which the engine E and the generator G are controlled such that the engine rotation speed changes in accordance with the charging electric power for the battery 3, which is set on the basis of the charging electric power limit. As a result, at a low temperature at which the charging performance of the battery 3 declines, it is possible to charge the battery 3 while preventing overcharging that promotes malfunction or deterioration of the battery 3.

Second Embodiment

Hereinafter, a second embodiment of the present invention will be described with reference to the accompanying drawings. In the following description, the same reference numerals are given to configurations identical to those of the first embodiment and detailed descriptions of the configurations are omitted.

Figure 10:
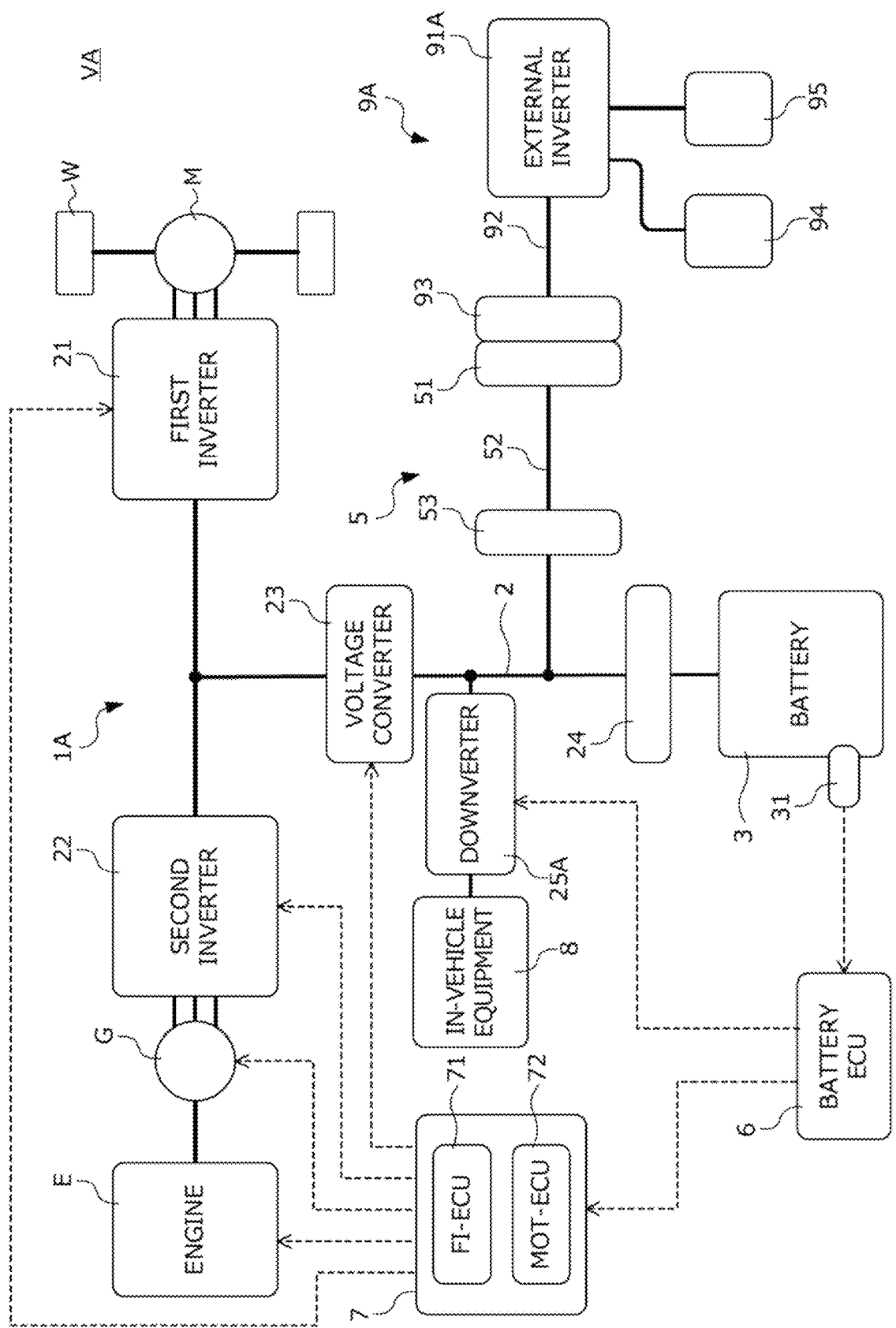
FIG. 10 is a diagram illustrating the configuration of a vehicle according to a second embodiment of the present invention.

FIG. 10 is a diagram illustrating the configuration of a vehicle VA according to the present embodiment. The vehicle VA according to the present embodiment is different from the first embodiment in terms of the configurations of an electric power supply system 1A and external equipment 9A. More specifically, the electric power supply system 1A according to the present embodiment further includes a downverter 25A. The downverter 25A interconnects the in-vehicle equipment 8 and the section between the voltage converter 23 and the battery contactor 24 on the main electric power line 2. The downverter 25A steps down the direct current electric power in the main electric power line 2 in accordance with a command from the battery ECU 6 and supplies the direct current electric power to the in-vehicle equipment 8.

The external equipment 9A according to the present embodiment is different from the first embodiment in terms of the configuration of an external inverter 91A. More specifically, the functions of the external inverter 91A include stepping down the direct current electric power that is supplied from the external electric power supply device 5 via the external electric power supply cable 92 to a voltage corresponding to the electrical equipment 94 and 95 and converting the direct current electric power into a single-phase alternating current.

EXPLANATION OF REFERENCE NUMERALS

V, VA VEHICLE
E ENGINE (ELECTRIC POWER GENERATION DEVICE)
G GENERATOR (ELECTRIC POWER GENERATION DEVICE)
1, 1A ELECTRIC POWER SUPPLY SYSTEM
2 MAIN ELECTRIC POWER LINE (ELECTRIC POWER LINE)
22 SECOND INVERTER (ELECTRIC POWER GENERATION DEVICE)
3 BATTERY (ELECTRIC POWER STORAGE DEVICE)
5 EXTERNAL ELECTRIC POWER SUPPLY DEVICE
7 ELECTRONIC CONTROL UNIT (CONTROLLER)
71 FI-ECU (CONTROLLER)
72 MOT-ECU (CONTROLLER)
9, 9A EXTERNAL EQUIPMENT

What is claimed is:

1. A vehicle comprising:
an electric power generation device including an engine and a generator that generates electric power by using power of the engine;
an electric power storage device that is connected to the electric power generation device via an electric power line and stores electric power generated by the electric power generation device;
an external electric power supply device that interconnects the electric power line and external equipment and supplies the external equipment with electric power in the electric power line; and
a controller that controls charging and discharging of the electric power generation device and the electric power storage device during external electric power supply by the external electric power supply device,
wherein the controller starts the engine and supplies electric power generated by the generator to the electric power storage device and the external equipment in a case where a remaining capacity of the electric power storage device is equal to or less than a predetermined first remaining capacity,
supplies the external equipment with electric power discharged from the electric power storage device in a case where the remaining capacity of the electric power storage device exceeds a second remaining capacity exceeding the first remaining capacity, and
executes fixed point control for controlling the engine such that an engine rotation speed is maintained constant while the generator generates electric power.

2. The vehicle according to claim 1, wherein the controller controls the engine and the generator so as to be maintained at engine torque set on the basis of an operation point at which a fuel consumption rate is minimized when the fixed point control is executed.

3. The vehicle according to claim 2, wherein the controller sets the first remaining capacity on the basis of an electric power storage device temperature as a temperature of the electric power storage device and increases the first remaining capacity as the electric power storage device temperature decreases in a case where the electric power storage device temperature is equal to or lower than a predetermined first temperature.

4. The vehicle according to claim 1, wherein the controller sets the first remaining capacity on the basis of an electric power storage device temperature as a temperature of the electric power storage device and increases the first remaining capacity as the electric power storage device temperature decreases in a case where the electric power storage device temperature is equal to or lower than a predetermined first temperature.

5. The vehicle according to claim 1, wherein the controller sets a charging electric power limit as a limit with respect to charging electric power at a time of charging of the electric power storage device on the basis of an electric power storage device temperature as a temperature of the electric power storage device and causes the charging electric power limit to approach 0 as the electric power storage device temperature decreases in a case where the electric power storage device temperature is equal to or lower than a predetermined second temperature, and the controller executes variable control for controlling the engine and the generator such that the engine rotation speed changes in accordance with charging electric power for the electric power storage device set on the basis of the charging electric power limit in a case where the electric power storage device temperature is equal to or lower than the second temperature.

* * * * *